April 19, 1960
W. C. PADGETT
2,933,727
APPARATUS FOR INDICATING THE TRUE AND RELATIVE
BEARINGS OF INCOMING RADIO SIGNALS
Filed Jan. 25, 1955
3 Sheets-Sheet 1
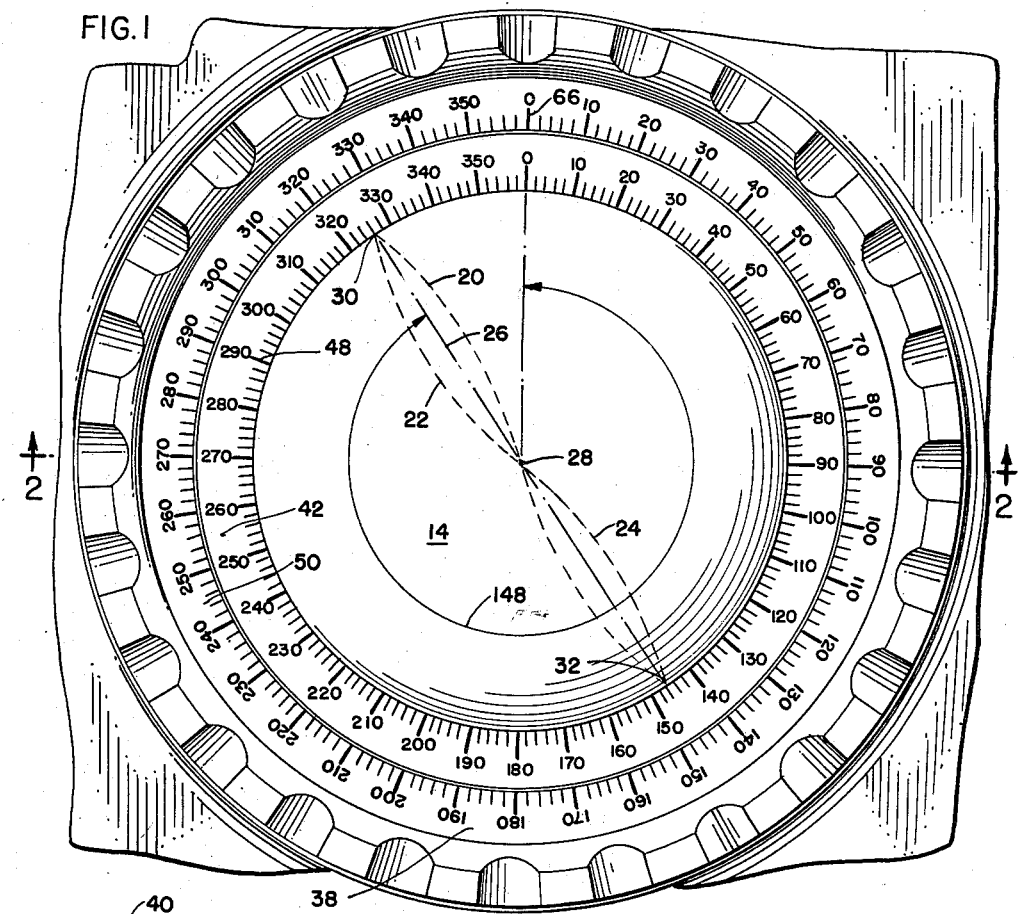
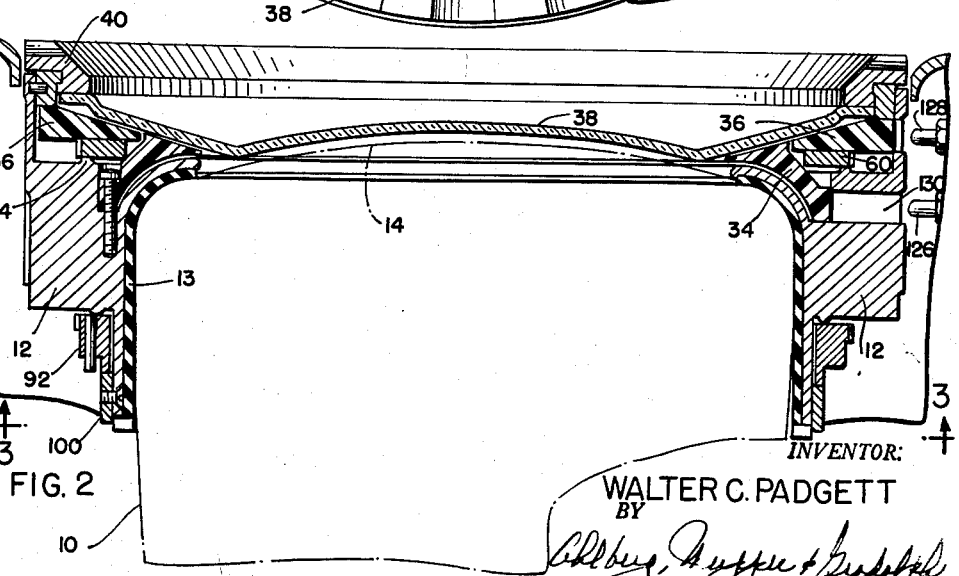
INVENTOR:
WALTER C. PADGETT
BY
ATTYS April 19, 1960

W. C. PADGETT 2,933,727

APPARATUS FOR INDICATING THE TRUE AND RELATIVE
BEARINGS OF INCOMING RADIO SIGNALS

Filed Jan. 25, 1955

INVENTOR:
WALTER C. PADGETT
BY
ATT'YS

April 19, 1960

W. C. PADGETT 2,933,727

APPARATUS FOR INDICATING THE TRUE AND RELATIVE
BEARINGS OF INCOMING RADIO SIGNALS

Filed Jan. 25, 1955

INVENTOR:
WALTER C. PADGETT
BY
ATT'YS

United States Patent Office 2,933,727
Patented Apr. 19, 1960

2,933,727

APPARATUS FOR INDICATING THE TRUE AND RELATIVE BEARINGS OF INCOMING RADIO SIGNALS

Walter C. Padgett, Elmhurst, Ill., assignor to Stewart-Warner Corporation, Chicago, Ill., a corporation of Virginia Application January 25, 1955, Serial No. 484,040

1 Claim. (Cl. 343—113)

The present invention relates to electronic apparatus for determining the bearing of incoming radio signals, or, more specifically, the azimuthal bearing of a source of radio signals and its bearing relative to the receiving station.

Apparatus of this character is shown in United States Patent No. 2,656,536 issued to R. W. Lockhart on October 20, 1953. Reference may be made to this patent for a more specific description of electronic apparatus incorporated into the present embodiment of the present invention.

In general, electronic apparatus of the prior art, as represented by the Lockhart patent, is capable of tracing on the face of a cathode ray oscillograph tube a visible pattern which is directionally oriented with respect to the direction of propagation of an incoming radio signal. When the apparatus is installed on board ship or other moving craft, rapid determination from the position of the tube pattern of the "true" bearing, that is, the azimuthal bearing of an incoming radio signal, is complicated by turning movements of the supporting craft.

One object of the present invention is to provide improved radio signal bearing indicating apparatus for use on board ship or other moving craft. A related object is to provide improved radio signal bearing indicating apparatus which facilitates accurate reading of either the relative or true bearing of an incoming radio signal.

Other objects and advantages will appear from the following description of the form of the invention illustrated in the drawings, in which Fig. 1 is a fragmentary plan view showing the indicating face of a cathode ray oscillograph tube and coacting alidade structure of radio signal direction indicating apparatus embodying the invention;

Fig. 2 is a fragmentary sectional view, taken along the line 2—2 of Fig. 1;

Figure 5:
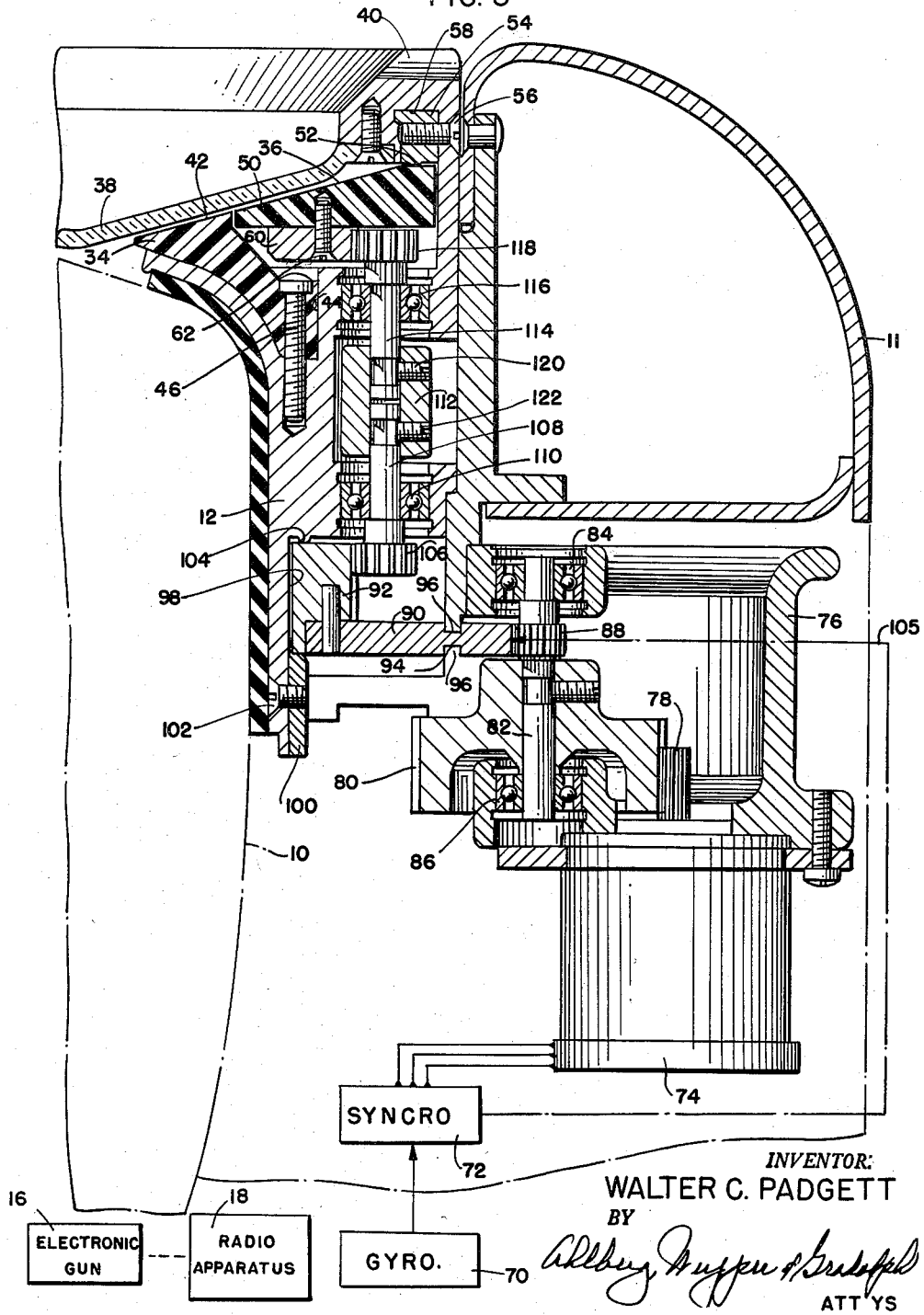
Fig. 5 is a fragmentary vertical sectional view showing a portion of the tube and alidade structure and driving structure for the true bearing scale, together with a diagrammatic illustration of coacting electronic and mechanical units of the overall apparatus.

The illustrated embodiment of the invention comprises a cathode ray tube 10, shown largely in diagrammatic form in Figs. 2 and 5, mounted in a housing 11 by supporting structure 12 encircling the outer end of the tube (Figs. 2 and 5). Cushioning is provided by a circular layer 13 of rubber or other resilient material interposed between the upper end of the tube and the adjacent support structure. It should be made clear that words denoting the directional relationship of components of the apparatus refer to the position of the structure in the drawings. As used, the screen of the tube will usually be in a vertical plane.

The cathode ray tube 10 is conventional in design. An electron gun 16 on the lower end of the tube 10, indicated diagrammatically in Fig. 5, directs a pencil of electron beams upwardly against the inner surface of an indicating or viewing screen 14 on the upper end of the tube. The pencil of electrons emitted from the gun 16 is controlled by electronic apparatus 18, also indicated diagrammatically in Fig. 5, to trace a pattern 20 on the tube screen 14 (Fig. 1) which is directionally oriented with the direction of a source of radio signals picked up by the control apparatus 18. Electronic apparatus 18 capable of performing this function is disclosed in the previously mentioned Lockhart Patent No. 2,656,536, and need not be specifically described here.

As indicated in Fig. 1, the pattern 20 traced on the tube screen 14 comprises two thin loops 22, 24 having a common line of symmetry 26 and extending in opposite directions from a common origin 28 coinciding with the center of the screen 14 to two extreme peaks 30, 32. The line of symmetry 26, determined by the peaks 30, 32 and juncture 28 between the loops 22, 24, is aligned accurately with the line of propagation of the radio signal picked up by the electronic apparatus 18. The apparatus 18 usually includes means to cause the sense to be indicated on the screen, as by having only one loop visible.

When the apparatus described is installed on board ship, for example, it is advantageous to determine quickly not only the bearing of the incoming radio signal "relative" to the ship, but also the "true" bearing of the signal in azimuth.

In accordance with the present invention, provision is made in an improved manner for direct reading of both the "relative" and "true" bearings of the incoming signal, while at the same time avoiding confusion between the two.

As shown in Figs. 1, 2, and 5, two concentric annular scale members 34, 36, formed from a translucent material, preferably plastic, are mounted in encircling relation to the central portion of the screen 14 on which the direction indicating pattern 20 is traced. Both scale members 34, 36, and the tube face 14, are protected by a downwardly dished cover 38 of transparent plastic or the like, attached to a ring 40 suitably mounted on the tube supporting structure 12.

From an annular conical face 42 (Fig. 5) the inner scale member 34 extends outwardly and downwardly into a circular groove 44 in the structure 12 embracing the upper end of the tube 10. A plurality of retaining screws 46 extend through the lower outer edge of the scale member 34 into the support structure 12, holding the scale member firmly in the groove 44.

A circular scale 48 on the face 42 of the scale member 34 is graduated from zero to 360° as shown in Fig. 1.

From a conical scale face 50 encircling the scale face 42 on the scale member 34, the scale member 36 extends radially outward under the ring 40. The upper outer edge of the scale member 36 slidably engages an annular antifriction ridge 52 extending downwardly from a locating ring 54. The ring 54 is secured by screws 56 in a groove 58 cut into the underside of the ring 40. An annular gear 60 secured by screws 62 to the underside of the scale member 36 rests on a circular antifriction ridge 64 (Fig. 2) extending upwardly from the support structure 12.

A scale 66 on the face 50 of the outer scale member 36 is graduated from zero to 360°, as shown in Fig. 1.

As previously intimated, the inner scale 48 on the member 34 is maintained in a position relative to the supporting craft, which is unaffected by turning movements of the craft.

The outer scale 66 on the member 36 is, in effect, stabilized with respect to the north-south or rotary axis of the earth by structure which compensates at all times for turning movements of the craft on which the apparatus is mounted. As indicated diagrammatically in Fig. 5, this compensation in the positioning of the outer scale member 36 is obtained by a gyroscope 70. In shipboard installations the ship's gyroscopic compass used for navigation and gunnery purposes, can serve also as the gyroscope 70 for the present apparatus. A synchronizing device 72 of conventional construction is connected between the gyroscope 70 and an electric motor 74 to control the motor in accordance with movements of the ship in relation to the gyroscope.

The electric motor 74 is attached to a support 76 located in the casing 11 at one side of the tube 10 and forming a part of the previously mentioned support structure 12 (Fig. 5). A driving pinion 78 protruding from the upper end of the motor 74 meshes with a gear 80 fixed to the central portion of a vertical shaft 82 journaled at its upper and lower ends in antifriction bearings 84, 86 in the support 76. A smaller gear 88 fixed to the shaft 82 between the gear 80 and the upper bearing 84 meshes with a large annular gear 90 encircling the tube 10 a substantial distance below the gear 60 attached to the scale member 36.

The inner marginal edge of the annular gear 90 is pinned to a wider concentric gear 92 of somewhat smaller diameter. Between its inner and outer marginal edges, the gear 90 is grooved at 94 on opposite sides to receive circular supporting and guiding projections 96 on the support structure above and below the gear.

The gear 92 and the attached gear 90 revolve around a vertical cylindrical section 98 of the support 12 encircling the tube 10. A circular band 100 secured by screws 102 around the lower end of the cylindrical support section 98 supports the lower inner edge of the base of the gear 92. The upper inner edge of the gear 92 slidably engages a downwardly extending annular ridge 104 on the support 12 located radially outward of the upper end of the cylindrical section 98.

A feedback 105 of conventional construction is connected between the gear 90 and the synchronizing device 72 which assures a precise positioning of the gear by the motor 74.

Figure 3:
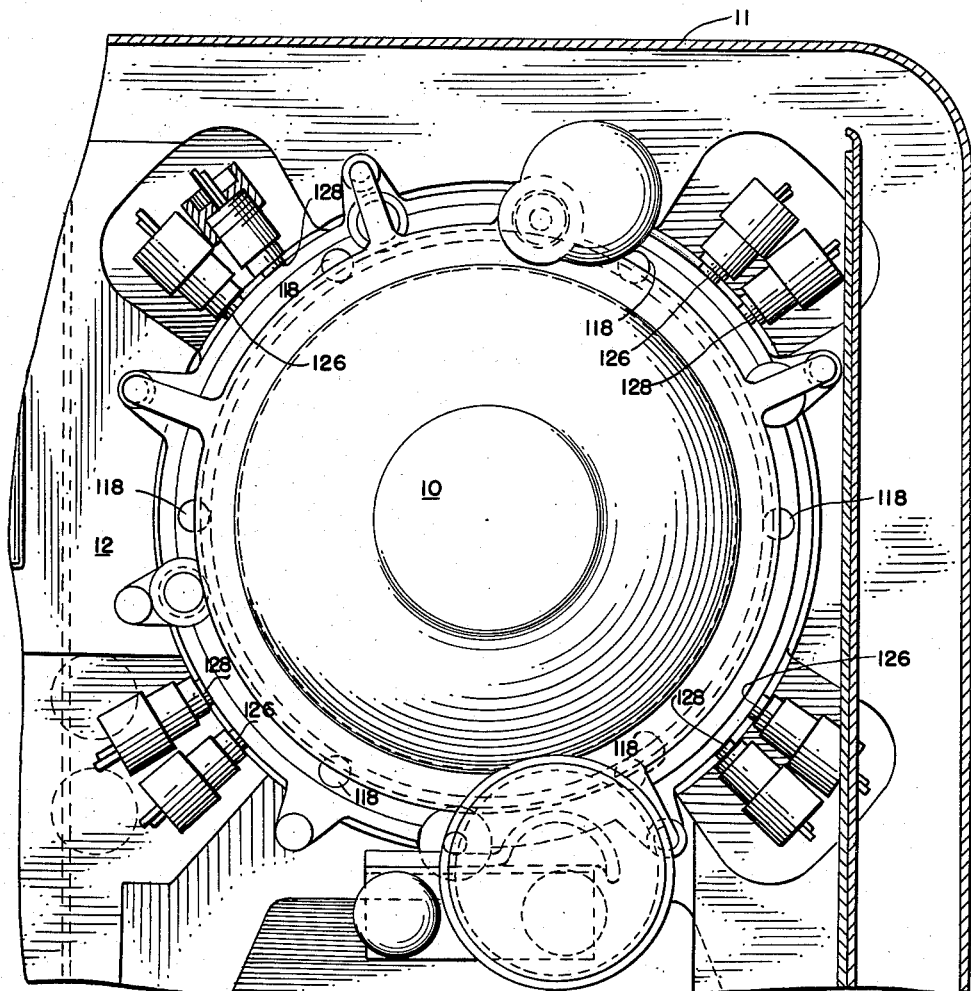
Fig. 3 is a fragmentary sectional view, taken along the line 3—3 of Fig. 2.

The annular gear 92 is drivingly connected to the scale member gear 60 by a plurality, in this instance six, pairs of interconnecting gears circumferentially spaced around the tube 10. As shown in Figs. 3 and 5, each geared interconnection between the lower gear 92 and the upper gear 60 comprises an interconnecting pinion 106 meshing with the gear 92 and attached to the lower end of a shaft 108 extending up through an antifriction bearing 110 in the support 12. The upper end of the shaft 10 is connected by a sleeve coupling 112 to the lower end of a similar shaft 114 which extends up through an upper antifriction bearing 116 in the support 12. A pinion 118 on the extreme upper end of the shaft 116 meshes with the scale member gear 60.

Set screws 120, 122 in the sleeve coupling 112 engage the adjacent ends of the respective shafts 108, 114. When either or both of the set screws 120, 122 are loosened, the shafts 108, 114 can be angularly adjusted relative to each other to remove backlash between the shaft gears 106, 118 and the coacting annular gears 92 and 60. Tightening of the set screws 120, 122 maintains this adjusted position of the coacting shafts 108, 114.

The circumferentially spaced driving connections thus provided between the scale gear 60 and the lower annular gear 92 assures that the scale 66 will follow with great precision the reversible rotary movements of the lower gear 92 and the attached gear 90. The gyro controlled synchronizing unit 72 operating through the motor 74, together with the follow-up structure 105 connected with the gear 90 provides turning movements of the gear 90, and hence the scale 66, in relation to the supporting structure 12 which are exactly the reverse (as viewed from the outer end of the tube 10) of changes in course of the ship.

The two concentric scales 48 and 66 are lighted individually through the translucent scale members 34, 36 by four pairs of lower and upper electric lamps 126, 128 circumferentially spaced around the peripheries of the scale members. (See Figs. 2 and 3.) The light from the four upper lamps 128, aligned with the outer edge of the scale member 36, diffuses through the scale member to provide an even lighting of the entire scale 66. The four lower lamps 126 are aligned with radial holes 130 extending through the support 12 to the lower outer edge of the inner scale member 34. The light from these lamps diffuses through the translucent structure of the scale member 34 to provide even lighting of the scale 48.

Figure 6:
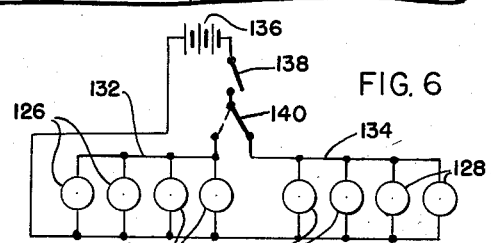
Fig. 6 is a diagrammatic illustration of lighting circuits for the "true" and "relative" bearing scales.

As indicated diagrammatically in Fig. 6, the lights 126 for the scale 48 are all connected together, in parallel as shown, to be lighted through a first circuit 132. Similarly, the lights 128 for the scale 66 are connected together to be lighted through a second circuit 134. Suitable means is provided for energizing the two lighting circuits 132, 134 alternately to light either one or the other of the scales 48, 66. As shown, a voltage source 136 is connected at one side to both circuits 132, 134. The other side of the voltage source 136 is connected to an on-off switch 138 connected in series with a selector switch 140, which provides for energization of one or the other of the circuits 132, 134.

Figure 4:
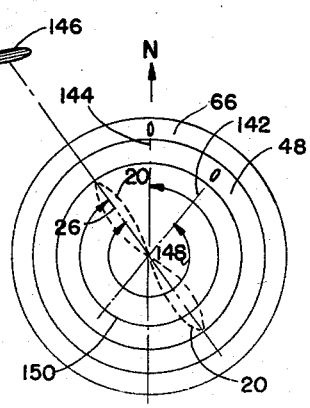
Fig. 4 is a diagrammatic illustration of the manner in which both "true" and "relative" bearings of an incoming radio signal are read from the tube and alidade structure of Fig. 1.

In reviewing the operation of the improved apparatus provided, it may be assumed that the alidade of the apparatus is generally horizontal and that the supporting craft is turned away from an exact north-south course to a north-easterly heading, for example. Thus, as indicated in the diagrammatic view of Fig. 4, the zero point on the relative bearing scale 48, which turns with the craft, is displaced clockwise to the position indicated by the line 142. The true bearing scale 66 is maintained in a stabilized azimuthal position, with the zero point on the scale lying in a north-south line 144 extending centrally through the scale.

The direction sensitive apparatus 18 is tuned to respond to a radio signal emitted from a sending station 146. The apparatus controls the tube 18 to produce the elongated visible light pattern 20, symmetrical about a line 26 coinciding with the direction of propagation of the signal from the station 146.

To read the bearing of the incoming signal relative to the receiving craft, the lights 126 are turned on by the switch 138 and the switch 140 to light the relative bearing scale 48. The relative bearing 148 (Fig. 4) of the incoming signal is read directly as the position of the line of symmetry of the pattern 20 on the scale 48.

Reading of the true bearing of the incoming signal requires only operation of the switch 140 to illuminate the scale 66 and reading on this scale the angular position 150 (Fig. 4) of the symmetry line 26 of the light pattern 20.

The provision for alternate lighting of the two scales 48, 66 thus avoids confusion between the relative and true bearings of the incoming signal, which are both read directly at the alidade of the apparatus.

While the above review of the operation of the apparatus may be strictly applicable only to the special case in which the tube face 14 and scales 48, 66 are generally horizontal, the same principles apply to the reading of the "true" and "relative" bearings of the incoming signal for other positions of the alidade of the apparatus. The orientation of the tube pattern 20 in relation to the "relative" or "fixed" bearing scale 48 always corresponds to direction of the incoming signals in relation to the craft supporting the receiving apparatus.

While I have shown and described a preferred embodiment of my invention, it will be apparent that numerous variations and modifications thereof may be made without departing from the underlying principles of the invention. I therefore desire, by the following claim, to include within the scope of the invention all such variations and modifications by which substantially the results of my invention may be obtained through the use of substantially the same or equivalent means.

I claim:

Apparatus adapted for use on movable craft such as a ship for indicating either the true bearing or the bearing relative to the supporting craft of an incoming radio signal, comprising, in combination, an elongated cathode ray tube having an enlarged viewing end including a screen thereon, stationary mounting means supporting said tube in a predetermined stationary position, electronic means responsive to an incoming radio signal and interconnected with said tube to trace a visible pattern on said tube screen oriented thereon with respect to the direction of propagation of the incoming signal relative to the tube, an annular scale member encircling said viewing end of said tube in fixed relation thereto and having a graduated annular scale for indicating the angular position of a pattern traced on said tube screen as representing the relative bearing of an incoming signal, a second annular scale member encircling said enlarged tube end in concentric relation to said first annular scale member, means movably supporting said second annular scale member for rotation around the axis of said tube, a first annular gear fixed to said second scale member and encircling said enlarged tube end, a second annular gear encircling said tube in axially spaced relation to said first annular gear, means mounting said second annular gear for rotation around said tube, a plurality of pinion assemblies mounted in circumferentially spaced relation to each other around said tube, each pinion assembly including a pair of pinions meshing with said respective annular gears and including a shaft connection between the two pinions having means for effecting rotary adjustment of the pinions with respect to each other to eliminate back-lash between the pinions and the respective gears meshing therewith, gyroscopic stabilizing means, and synchronizing means connected between said gyroscopic stabilizing means and said second annular gear for rotating the latter to maintain through said pinion assemblies and said first annular gear a continuous rotary adjustment of said second scale member which compensates for different headings of the supporting craft to provide a direct indication on said second scale of the position of a pattern on said tube screen as representing the true bearing of an incoming radio signal.

References Cited in the file of this patent

UNITED STATES PATENTS

| | | |
|---|---|---|
| 2,038,241 | Schofield | Apr. 21, 1936 |
| 2,209,191 | Dearing | July 23, 1940 |
| 2,489,251 | Anast | Nov. 29, 1949 |
| 2,588,916 | Field et al. | Mar. 11, 1952 |
| 2,688,130 | Whitaker et al. | Aug. 31, 1954 |
| 2,697,827 | Whitaker | Dec. 21, 1954 |